(12) United States Patent
Kim et al.

(10) Patent No.: US 9,426,300 B2
(45) Date of Patent: Aug. 23, 2016

(54) MATCHING REVERBERATION IN TELECONFERENCING ENVIRONMENTS

(71) Applicant: Dolby Laboratories Licensing Corporation, San Francisco, CA (US)

(72) Inventors: Doh-Suk Kim, Cupertino, CA (US); Gary Spittle, Hillsborough, CA (US)

(73) Assignee: Dolby Laboratories Licensing Corporation, San Francisco, CA (US)

( * ) Notice: Subject to any disclaimer, the term of this patent is extended or adjusted under 35 U.S.C. 154(b) by 77 days.

(21) Appl. No.: 14/489,907

(22) Filed: Sep. 18, 2014

(65) Prior Publication Data

US 2015/0092950 A1 Apr. 2, 2015

Related U.S. Application Data

(60) Provisional application No. 61/883,663, filed on Sep. 27, 2013.

(51) Int. Cl.
| | |
|---|---|
| *H04R 3/00* | (2006.01) |
| *H04M 3/56* | (2006.01) |
| *H04S 7/00* | (2006.01) |
| *H04M 9/08* | (2006.01) |
| *G10K 15/08* | (2006.01) |
| *H04R 27/00* | (2006.01) |
| *H04M 3/18* | (2006.01) |

(52) U.S. Cl.
CPC ............ *H04M 3/568* (2013.01); *H04M 9/082* (2013.01); *H04S 7/306* (2013.01); *G10K 15/08* (2013.01); *H04M 3/18* (2013.01); *H04R 27/00* (2013.01); *H04S 2400/01* (2013.01); *H04S 2420/01* (2013.01)

(58) Field of Classification Search
None
See application file for complete search history.

(56) References Cited

U.S. PATENT DOCUMENTS

| | | | |
|---|---|---|---|
| 6,510,224 | B1 | 1/2003 | Christensson |
| 7,286,674 | B2 | 10/2007 | Karjalainen |
| 7,391,876 | B2 | 6/2008 | Cohen |
| 7,464,029 | B2 | 12/2008 | Visser |
| 7,634,093 | B2 | 12/2009 | McGrath |
| 7,881,927 | B1 | 2/2011 | Reuss |
| 8,036,767 | B2 * | 10/2011 | Soulodre ................. G01H 7/00 381/63 |

(Continued)

FOREIGN PATENT DOCUMENTS

WO 2013/058728 4/2013

OTHER PUBLICATIONS

Huang, Y. et al. "Immersive Audio Schemes" IEEE Signal Processing Magazine, vol. 28, Issue 1, pp. 20-32, published in Jan. 2011.

(Continued)

*Primary Examiner* — Brenda Bernardi
(74) *Attorney, Agent, or Firm* — Charles Lawrence Hamilton

(57) ABSTRACT

A system and method of matching reverberation in teleconferencing environments. When the two ends of a conversation are in environments with differing reverberations, the method filters the reverberation so that when both signals are output at the near end (e.g., the audio signal from the far end and the sidetone from the near end), the reverberations match. In this manner, the user does not perceive an annoying difference in reverberations, and the user experience is improved.

30 Claims, 7 Drawing Sheets

(56) References Cited

U.S. PATENT DOCUMENTS

| | | |
|---|---|---|
| 8,213,637 B2 | 7/2012 | Brannmark |
| 8,229,105 B2 | 7/2012 | Michaelis |
| 8,363,853 B2 | 1/2013 | Bharitkar |
| 8,515,104 B2 | 8/2013 | Dickins |
| 2008/0025519 A1 | 1/2008 | Robinson |
| 2009/0041254 A1 | 2/2009 | Jin |
| 2009/0046864 A1 | 2/2009 | Mahabub |
| 2010/0020940 A1 | 1/2010 | Zad-Issa |
| 2012/0213375 A1 | 8/2012 | Mahabub |
| 2012/0221329 A1 | 8/2012 | Harsch |
| 2013/0010975 A1* | 1/2013 | Tsingos .............. G10L 21/0202 381/63 |
| 2013/0100240 A1 | 4/2013 | Liu |

OTHER PUBLICATIONS

Garre, Veera Tej, et al "An Acoustic Echo Cancellation System Based on Adaptive Algorithms" Department of Applied Signal Processing, published in Oct. 2012.

Eaton, J. et al "Noise-Robust Reverberation Time Estimation Using Spectral Decay Distributions with Reduced Computational Cost" IEEE Proc. on Acoustics, Speech and Signal Processing, Vancouver, Canada, May 26-31, 2013, pp. 161-165.

Naylor, P. et al "Speech Dereverberation" Proc. of International Workshop on Acoustic Echo and Noise Control, Eindhoven, The Netherlands, pp. 89-92, Sep. 2005.

Naylor, P. et al "Speech Dereverberation" Springer-Verlag London Limited, published on Jul. 28, 2010.

* cited by examiner

MATCHING REVERBERATION IN TELECONFERENCING ENVIRONMENTS

CROSS REFERENCE TO RELATED APPLICATIONS

This application claims benefit of priority to related, U.S. Provisional Patent Application No. 61/883,663 filed on Sep. 27, 2013, entitled, "Matching Reverberation in Teleconferencing Environments," which is incorporated herein by reference in its entirely.

TECHNICAL FIELD

The present invention relates to teleconferencing, and in particular, to improving a user's auditory experience in a teleconference.

BACKGROUND

Unless otherwise indicated herein, the approaches described in this section are not prior art to the claims in this application and are not admitted to be prior art by inclusion in this section.

In a typical teleconference, the participants are in different locations. These locations may be referred to as the "near end" and the "far end". (Note that the designations "near end" and "far end" are relative in order to provide a perspective for this discussion.) In general, the near end device outputs the sound from the far end; the near end device also receives sound input for transmission to the far end. The far end device operates in a similar manner.

Many near end devices include a sidetone generator. The "sidetone" refers to a portion of the near end sound that is also output at the near end. The sidetone generator outputs the sidetone in order for the near end user to receive feedback on the sounds originating at the near end. (User experience studies show that without the sidetone, near end users can perceive a sense of isolation and that the communication channel to the far end is weak or inoperative.) The sidetone is usually generated when the near end device is operating as a handset or headset; the sidetone is usually not generated when the near end device is operating as a speaker phone, due to potential feedback.

Often the different locations involved in the teleconference will have different acoustic environments. For example, one group of participants may be in a conference room, and the other participant may be in a small office room; the conference room will often be more reverberant than the small office room. Similarly, the conference room participants may be using a speaker phone, and the small office room participant may be using a telephone handset; the speaker phone will receive a more reverberant input than the telephone handset. The difference in reverberation is even greater when one of the participants is using a headset, which generates very little reverberation, if any (referred to as a "dry" acoustic environment).

SUMMARY

In the teleconferencing environment described above, participants at the near end may have a different reverberant environment than the participants at the far end. When the far end participants are in an environment that is more reverberant than that of the near end participants, the near end participant hears more reverberation in the sound from the far end than in the sidetone. This difference in reverberation causes the near end participant to have reduced enjoyment of the teleconferencing experience.

In response to the above-noted shortcomings, an embodiment implements a method of matching reverberation between the near end and the far end in the teleconference.

According to an embodiment, method matches acoustics in a telecommunications system. The method includes receiving, in a near end environment, a first audio signal from a far end environment and a second audio signal from the near end environment. The method further includes determining acoustic parameters for the first audio signal. The acoustic parameters correspond to the far end environment. The method further includes performing filtering on the second audio signal according to the acoustic parameters to generate a filtered sidetone signal. The second audio signal is filtered such that acoustic parameters of the filtered sidetone signal match the acoustic parameters of the first audio signal. The method further includes outputting in the near end environment an output signal corresponding to the first audio signal and the filtered sidetone signal.

According to an embodiment, method matches acoustics in a telecommunications system. The method includes receiving, in a near end environment, a first audio signal from a far end environment and a second audio signal from the near end environment. The method further includes determining acoustic parameters for the first audio signal. The acoustic parameters correspond to the far end environment. The method further includes performing inverse filtering on the first audio signal according to the acoustic parameters to generate an inverse filtered first audio signal. The first audio signal is inverse filtered such that acoustic parameters of the inverse filtered first audio signal match the acoustic parameters of the first audio signal having been inverse filtered. The method further includes generating a sidetone signal from the second audio signal. The method further includes outputting in the near end environment an output signal corresponding to the inverse filtered first audio signal and the sidetone signal.

According to an embodiment, method matches acoustics in a telecommunications system. The method includes receiving, in a near end environment, a first audio signal from a far end environment and a second audio signal from the near end environment. The method further includes determining acoustic parameters for at least one of the first audio signal and the second audio signal. The acoustic parameters correspond to at least one of the far end environment for the first audio signal and the near end environment for the second audio signal. The method further includes performing filtering on at least one of the first audio signal and the second audio signal in order to match the acoustic parameters of at least one of the first audio signal and the second audio signal to acoustic parameters of a reference environment. The method further includes outputting in the near end environment an output signal including the filtered signal.

Determining the acoustic parameters may include detecting a reverberation in the audio signal, and generating an impulse response function that models the reverberation in the audio signal. Determining the acoustic parameters may include receiving metadata that is descriptive of an acoustic environment of the far end, and generating, from the metadata, an impulse response function that models the reverberation in the audio signal.

Performing filtering may include filtering the second audio signal according to an impulse response function that models reverberation in the first audio signal. Performing inverse filtering may include inverse filtering the first audio signal according to an impulse response function that models reverberation in the first audio signal.

An embodiment may further include performing location processing on the first audio signal to generate a left signal and a right signal having location cues. The method may further include adding the sidetone signal (or the filtered sidetone signal) to the left signal and to the right signal to generate a left combined signal and a right combined signal. The method may further include performing reverberation filtering on the left combined signal and the right combined signal to generate the output signal.

An apparatus may include one or more circuits that are configured to implement one or more of the method steps. The circuits may include discrete elements (e.g., a filter circuit, an amplifier circuit, etc.), elements that operate on digital information (e.g., a reverb detector, a digital filter, etc.), general digital elements (e.g., a processor that implements a digital filter, a processor that implements both a reverb detector and a digital filter, etc.), mixed analog and digital circuit elements, etc. The apparatus may include, or be a part of, a device such as a computer or speakerphone.

A computer program may control a device to implement one or more of the method steps. The device may be a computer, a teleconferencing unit, a speakerphone, etc.

The following detailed description and accompanying drawings provide a further understanding of the nature and advantages of embodiments of the present invention.

DETAILED DESCRIPTION

Figure 1:
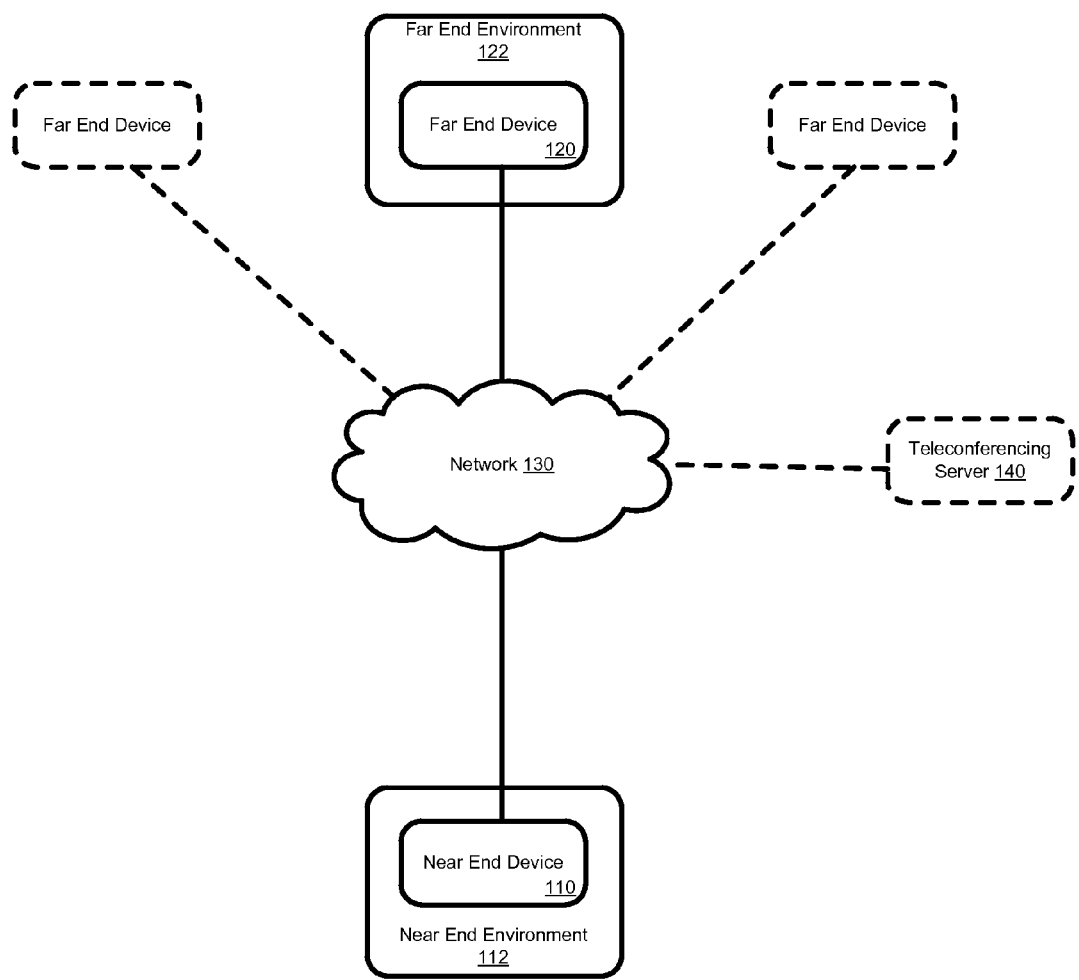
FIG. 1 is a block diagram showing a telecommunications environment according to one example embodiment.

Described herein are techniques for matching reverberation in teleconferencing environments. In the following description, for purposes of explanation, numerous examples and specific details are set forth in order to provide a thorough understanding of the present invention. It will be evident, however, to one skilled in the art that the present invention as defined by the claims may include some or all of the features in these examples alone or in combination with other features described below, and may further include modifications and equivalents of the features and concepts described herein.

In the following description, various methods, processes and procedures are detailed. Although particular steps may be described in a certain order, such order is mainly for convenience and clarity. A particular step may be repeated more than once, may occur before or after other steps (even if those steps are otherwise described in another order), and may occur in parallel with other steps. A second step is required to follow a first step only when the first step must be completed before the second step is begun. Such a situation will be specifically pointed out when not clear from the context.

In this document, the terms "and", "or" and "and/or" are used. Such terms are to be read as having the same meaning; that is, inclusively. For example, "A and B" may mean at least the following: "both A and B", "only A", "only B", "at least both A and B". As another example, "A or B" may mean at least the following: "only A", "only B", "both A and B", "at least both A and B". When an exclusive-or is intended, such will be specifically noted (e.g., "either A or B", "at most one of A and B").

The following discussion uses the term "reverberation" (or "reverb"). In general, reverberation refers to the persistence of sound in a particular space after the original sound is produced, due to the acoustics of that space. A reverberation is created when a sound is reflected off of surfaces in a space causing echoes to build up and then slowly decay as the sound is absorbed by the walls and air. The physical space that generates the reverberation may be referred to as the reverberant environment, the acoustic environment, or just the "environment" (when the acoustic usage is otherwise clear from the context). In telecommunication systems, the audio including the reverberation is captured at one end, transmitted, and output at the other end; listeners at the other end may perceive an additional, minor reverberation of the output due to the acoustics at that end.

As mentioned above, sidetone is used to provide the user feedback that the "line is active". For old telephony systems this provided the user an indication that the call was connected, and therefore, the person on the other end can hear the user talking. Further to this, the sidetone removes a sense of isolation and discomfort if one or both the ears are occluded, for example by holding a telephone handset against the ear or wearing headphones. By doing so, the acoustic path between the mouth and the ear is changed, resulting in a different spectral shape to the sound the user hears when the user talks. An extreme example would be like talking with your fingers in your ears. Sidetone helps to relieve that sensation. Also, sidetone helps to control the level at which a user will talk. If users are given no feedback, the users assume they cannot be heard and so tend to talk louder. If too much sidetone is presented to the users they tend to talk quieter.

One of the features of embodiments discussed below is to simulate the natural sidetone path we experience every time we talk. This is predominantly the bone conduction to the inner ear. However, there is also an acoustic path of the direct sound to the ear canal, plus the reverberation of the room acoustics we are talking in.

FIG. 1 is a block diagram showing a telecommunications environment 100 according to one embodiment. The telecommunications environment 100 includes a near end device 110 and a far end device 120 that are connected via a network 130. The near end device 110 is located in a near end environment 112, and the far end device is located in a far end environment 122. The near end environment 112 and the far end environment 122 have different reverberation characteristics.

The near end device 110 generally operates as a telecommunications device. The near end device 110 may be a dedicated device such as a telephone with a handset or headset, a mobile phone, a telephone operating as a speakerphone, or a speakerphone. The near end device 110 may be implemented by a dedicated teleconferencing device that includes other features such as videoconferencing. The near end device 110 may be implemented as a soft phone on a computer; the computer may include a headset, a handset, or may operate as a speakerphone or teleconferencing device.

The far end device 120 generally operates as a telecommunications device. The far end device 120 may be a dedicated device such as a telephone with a handset or headset, a mobile phone, a telephone operating as a speakerphone, or a speakerphone. The far end device 120 may be implemented by a dedicated teleconferencing device that includes other features such as videoconferencing. The far end device 120 may be implemented as a soft phone on a computer; the computer may include a headset, a handset, or may operate as a speakerphone or teleconferencing device.

The network 130 may be a telecommunications network (e.g., the telephone network) or a computer network (e.g., local area network, wide area network, the internet, etc.). The implementation of the devices 110 and 120 may depend upon the network 130. For example, when the network 130 is the telephone network, the device 110 may be a standard telephone, and the device 120 may be a standard speakerphone. When the network 130 is the internet, the device 110 may be a computer with a headset (e.g., implementing a voice over internet protocol (VoIP) phone, implementing a peer-to-peer connection such as Skype™, etc.) and the device 120 may be another computer.

In general, "near end" and "far end" are relative terms; for clarity, the operation of the system may be described from the perspective of the near end. Although multiple far end devices are shown in FIG. 1, two devices are sufficient to explain embodiments of the present invention. Such a use case may occur when one device initiates a telephone call to the other device.

The telecommunications environment 100 includes optional components (shown with dashed lines) of additional far end devices (120a and 120b shown) and a teleconferencing server 140. The additional far end devices are in their respective environments (not shown), the reverberation characteristics of which may differ from those of the environments 112 and 122. When present, the operation of the additional far end devices is similar to that of the far end device 120 from the perspective of the near end device 110.

The teleconferencing server 140 generally implements a teleconference. For example, the near end device 110 and the far end device 120 may dial in to a dedicated teleconference number instead of connecting to each other, or connect to a shared IP address for a VoIP conference; the teleconferencing server 140 manages the teleconference in that situation. Alternatively, the teleconferencing server 140 may be implemented as one or more of the telecommunications switches in the network 130.

Further details of the components that equalize the reverberation in the telecommunications environment 100 are provided below.

Figure 2:
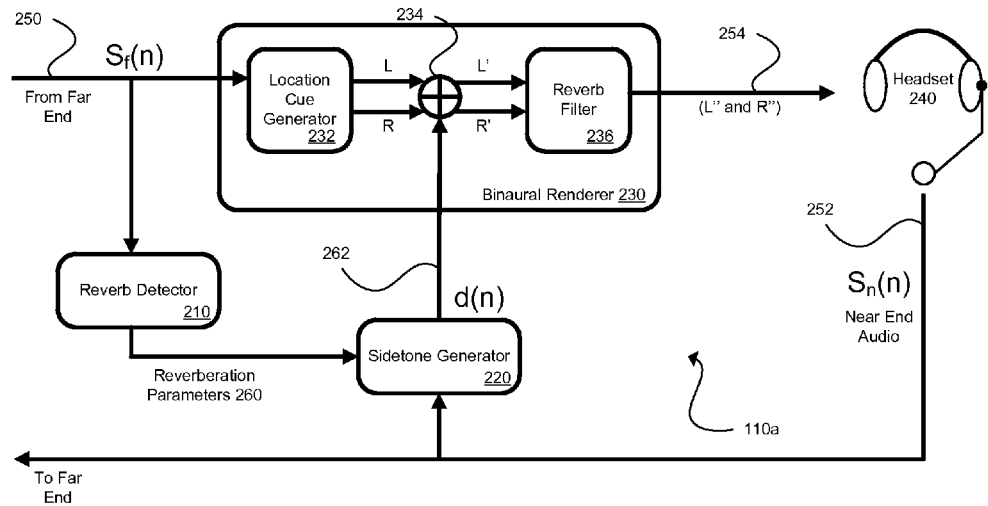
FIG. 2 is a block diagram showing details of a near end device according to one example embodiment.

FIG. 2 is a block diagram showing details of a near end device 110a (e.g., the near end device 110 of FIG. 1) according to one embodiment. The near end device 110a includes a reverb detector 210, a sidetone generator 220, and a binaural renderer 230. The near end device 110a is shown connected to a headset 240, which includes left and right headphones and a microphone. In general operation, the near end device 110a receives an audio signal 250 from the far end, receives an audio signal 252—$S_n(n)$—from the headset 240 that it transmits to the far end, and outputs an output signal 254 to the headset 240. The specific processing that the near end device 110a performs to generate the output signal 254 is described below.

The reverb detector 210 receives the audio signal 250 from the far end—$S_f(n)$, detects and models the reverberation present in the signal, and sends reverberation parameters 260 to the sidetone generator 220. The reverberation parameters 260 model the far end room acoustics. The reverberation parameters 260 may be in the form of an impulse response function $h_f(n)$.

Note that it is not necessary for the reverberation parameters 260 to create an exact replica of the far end room acoustics. It is adequate to simulate the main characteristics of the far end room, such as reverberation tail length and spectral decay. Spectral decay can be estimated from the mono signal. See J. Eaton, N. D. Gaubitch and P. A. Naylor, "Noise-robust reverberation time estimation using spectral decay distributions with reduced computational cost", in Proc. IEEE Intl. Conf. on Acoustics, Speech and Signal Processing (ICASSP), Vancouver, Canada (2013). According to an embodiment, sets of pre-defined spectral decay values (corresponding to a set of rooms with different acoustic properties) are stored, and then the estimated spectral decay is matched to the nearest one of those rooms.

If the microphone capture at the far end is not sensitive enough to obtain the full reverberation tail and cuts off early (e.g., due to the dynamic range on low cost devices), the spectral decay estimate would be based on what is in the received signal. This is fine, as the secondary reverb filter 236 (discussed below regarding the externalization) will smooth out the low level parts of the reverb tails and provide a more consistent sound.

The sidetone generator 220 receives the audio signal 252 from the headset 240, receives the reverberation parameters 260, modifies the audio signal 252 according to the reverberation parameters 260, and outputs a sidetone signal 262—d(n). The sidetone signal 262 is further modified by the binaural renderer 230 and output as part of the output signal 254 output by the headset 240. Further details of the sidetone generator 220 are provided with reference to FIG. 3.

The binaural renderer 230 receives the audio signal 250 from the far end, performs location cue processing on the audio signal 250 from the far end (such as by applying head related transfer function (HRTF) filters, as detailed below), adds the sidetone signal 262 to the location cue processed audio signal 250, performs reverberation filtering on the combined signal, and outputs the filtered combined signal as the output signal 254 to the headset 240. The output signal 254 has left and right components for the left and right headphones of the headset 240, as further described below. The binaural renderer 230 comprises a location cue generator 232, an adder 234 and a reverb filter 236.

The location cue generator 232 processes the audio signal 250 from the far end into signals having location cues. One example is head-related transfer function (HRTF) processing, which generates left and right signals for output by the headset 240. HRTF is a function that characterizes how an ear receives a sound from a point in space; a pair of HRTFs (for the left and right ears) can be used to synthesize a binaural sound from a mono signal, that is perceived to come from a particular point in space. It is a transfer function, describing how a sound from a specific point will arrive at the ear, and consists of inter-aural time difference (ITD), inter-aural level difference (ILD) and spectral differences. The HRTF for a headset may be implemented by convolving two Head Related Impulse Responses (HRIR) with the input signal, to result in a left output signal L and a right output signal R. The HRTF may be configured, with the use of a reverberation, such that the near end user (with a headset) perceives the far end audio as being externalized, i.e. perceived outside of the head, instead of being perceived as equal mono signals in the left and right ears (termed "diotic"). In a teleconferencing environment with two far ends, the HRTF may be configured separately for each incoming signal, such that the near end user perceives one far end as originating to the front and left, and the other far end as originating to the front and right. Additional HRTFs may be used when there are more far end locations in the teleconference.

Besides HRTF, other location cue processing functions include separate inter-aural time difference (ITD) and inter-aural level difference (ILD), such as level panning. Different combinations of ITD and ILD can be used to simulate locations in space. Similar to the implementation of HRTF, the ITD and ILD can be applied either in the time domain or frequency domain. It is possible to adjust the ITD or ILD independently. This allows a simple implementation of perceptually different locations in space. The type of location cue processing to implement may vary according to design requirements. For systems with relatively large processing power and relatively large memory, HRTFs may be appropriate, whereas panning may be implemented in more constrained systems.

The adder 234 receives the L and R signals from the location cue generator 232, adds the sidetone signal 262 to each, and sends the combined signals L' and R' to the reverb filter 236. According to an embodiment, the sidetone signal 262 is added to each signal equally. This simulates the natural sidetone path which is equal to each ear, giving a perception of a central location in the head. In other embodiments, the sidetone signal 262 may not be added equally to each signal.

The reverb filter 236 receives the signals L' and R' from the adder 234, applies reverberation filtering, and outputs the filtered signals L" and R" as the output signal 254 to the headset 240. More specifically, the reverb filter 236 applies the reverberation function—$h_{ext}(n)$—to the L' and R' signals to externalize the sound perceived by the user from the left and right headphones, in order to improve the user experience. The reverberation function $h_{ext}(n)$ may be a filter function that convolves a room impulse response with the respective signals L' and R'.

The reverberation function $h_{ext}(n)$ may correspond to an impulse response measurement from the near end environment (e.g., obtained via the microphone of the headset 240), or may be selected from a variety of pre-defined settings. For example, the pre-defined settings may correspond to a dry environment (e.g., a recording studio), a low reverberation environment (e.g., a small room), a medium reverberation environment (e.g., a large room), etc. The pre-defined settings may correspond to ranges of settings that the near end user may select. For example, the default setting may be a low reverberation environment; the near end user may increment and decrement the reverberation in steps (e.g., 10 steps decrementing to reach the dry environment, or 10 steps incrementing to reach the medium reverberation environment). The settings can be used, for example, to match the externalization reverberation to the acoustics of the room the user is talking in. Also, the settings can be user to select a reverberation characteristic the user prefers for single participant (point to point) or multi-participant (conference call) scenarios.

Figure 3:
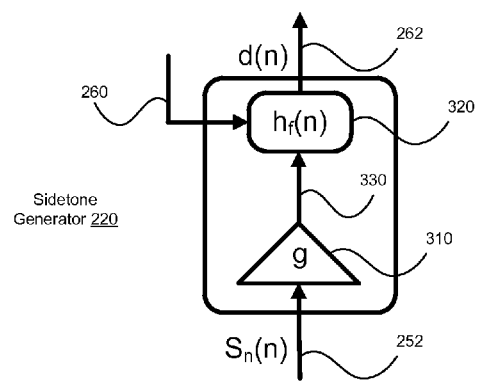
FIG. 3 is a block diagram showing details of the sidetone generator according to one example embodiment.

FIG. 3 is a block diagram showing details of the sidetone generator 220 (see FIG. 2) according to one embodiment. The sidetone generator 220 includes an amplifier 310 and a filter 320. The amplifier 310 applies a gain g to the audio signal 252 from the headset 240; generally for a sidetone signal g is set to provide a low level signal into the ear canal. The gain g should compensate for the proximity of the microphone to the mouth, compared to the distance of the ear canal to the mouth, plus any ADC and DAC processing that is applied within the headset device, such that the sidetone signal provides proportional feedback to the near end user. The amplifier 310 outputs the amplified sidetone signal 330 to the filter 320.

The filter 320 receives the amplified sidetone signal 330 and the reverberation parameters 260, filters the sidetone signal 330 using the reverberation parameters 260, and generates the sidetone signal 262. For example, when the reverberation parameters 260 correspond to an impulse response $h_f(n)$ that models the far end acoustics environment, the filter 320 convolves the impulse response $h_f(n)$ with the amplified sidetone signal 330 to generate d(n), the sidetone signal 262. The function of the sidetone generator 220 may then be represented mathematically as follows:

$$d(n)=g\, S_n(n)*h_f(n)$$

As another example, the reverberation parameters 260 may correspond to an impulse response for a user reverberation setting—$h_u(n)$. The user reverberation setting corresponds to one or more pre-defined reverberation settings that the user may select. In one embodiment, the user reverberation setting may be automatically selected to a reference setting with or without user input. As another example, the reverberation parameters 260 may correspond to an impulse response for a near end reverberation setting—$h_n(n)$. The near end reverberation setting corresponds to the reverberation at the near end.

An example use case is as follows. The far end device 120 (see FIG. 1) is a speakerphone, and the near end user is using the headset 240 (see FIG. 2). In such a case, the sidetone signal 330 has little reverberation, and the audio signal 250 from the far end has more reverberation. The reverberation parameters 260 correspond to the reverberation in the audio signal 250 from the far end. The filter 320 uses the reverberation parameters 260 to filter the sidetone signal 330, with the result that the reverberation in the sidetone signal 262 matches the reverberation of the audio signal 250 from the far end. As a result, the user at the near end does not perceive a mismatch in the reverberations of the two signals 250 and 262 output by the headset 240. This gives the user the perception they are placed within the far end acoustic environment and thus provides a more immersive teleconferencing environment.

Figure 4:
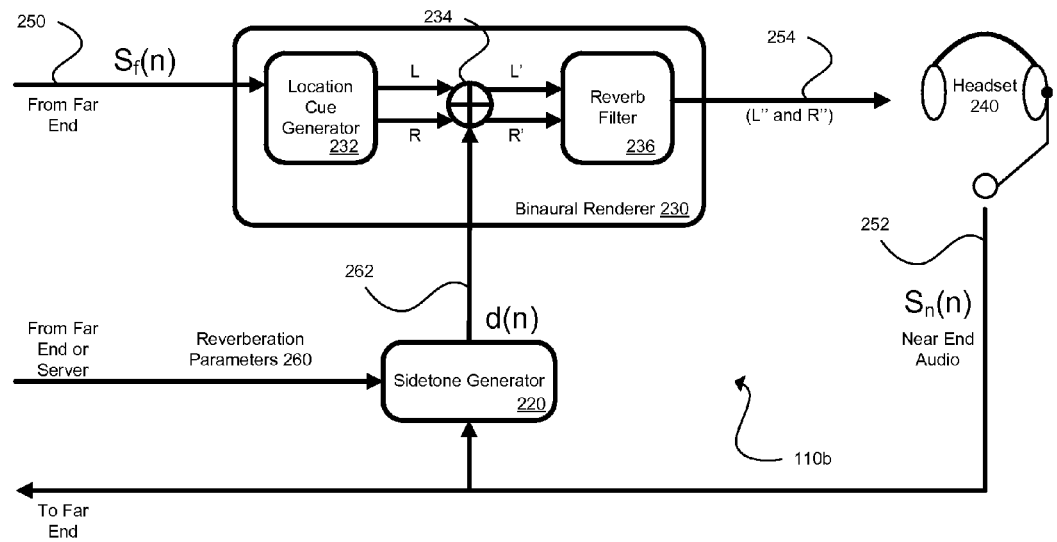
FIG. 4 is a block diagram showing details of a near end device according to one example embodiment.

FIG. 4 is a block diagram showing details of a near end device 110b (e.g., the near end device 110 of FIG. 1) according to one embodiment. The near end device 110b is similar to the near end device 110a (see FIG. 2), with similar components being numbered similarly. One difference is the removal of the reverb detector 210. Instead, the reverberation parameters 260 are received as metadata. The metadata is descriptive of the far end acoustic environment, such as an impulse response function or filter coefficients for the sidetone generator 220. The metadata may be generated at the far end (e.g., the far end device 120 of FIG. 1 may include a reverb detector similar to the reverb detector 210 of FIG. 2). The metadata may be generated by the teleconferencing server 140 (see FIG. 1) that includes a reverb detector, e.g. similar to the reverb detector 210 of FIG. 2. The transmission of the metadata will depend upon the specific teleconferencing protocol implemented. For example, the metadata may be transmitted as part of an out-of-band signal, in a separate control channel for the teleconference, as part of the control data packets for the teleconference, embedded as a coded object of the far end audio capture, etc.

Figure 5:
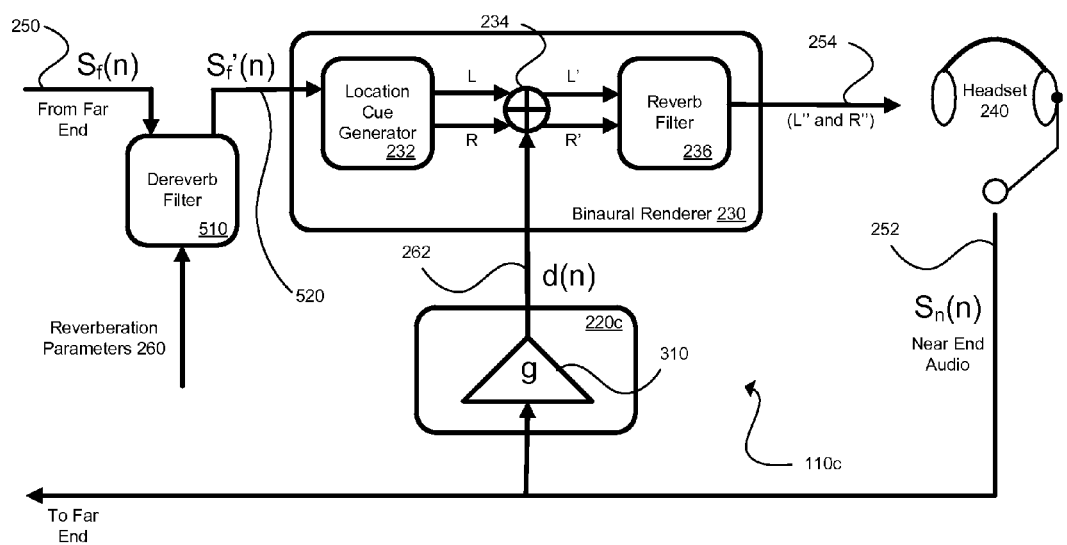
FIG. 5 is a block diagram showing details of a near end device according to one example embodiment.

FIG. 5 is a block diagram showing details of a near end device 110c (e.g., the near end device 110 of FIG. 1) according to one embodiment. The near end device 110c is similar to the near end device 110a (see FIG. 2) or the near end device 110b (see FIG. 4), with similar components being numbered similarly. One difference is that the sidetone generator 220c includes the amplifier 310 (see FIG. 3) but not the filter (cf. the filter 320 in FIG. 3).

An additional difference is the addition of a dereverb filter 510. The dereverb filter 510 receives the audio signal 250 from the far end—$S_f(n)$, receives the reverberation parameters 260, performs inverse filtering of $S_f(n)$ according to the reverberation parameters 260, and generates an inverse filtered audio signal 520—$S_f'(n)$. The binaural renderer 230 receives the inverse filtered audio signal 520 and processes it with the sidetone signal 262 (as in FIG. 2 or FIG. 4).

The reverberation parameters 260 may be in the form of an impulse response function $h_f(n)$ or filter coefficients that model the far end acoustic environment; the filter coefficients may then be used to generate the impulse response function. The dereverb filter 510 convolves the inverse of the impulse response function $h_f(n)$—$h_{fi}(n)$—with the audio signal 250 from the far end, to generate the filtered audio signal 520; this may be represented mathematically as follows:

$$S_f'(n)=S_f(n)*h_{fi}(n)$$

The reverberation parameters 260 may be obtained from a reverb detector (see the reverb detector 210 in FIG. 2; not shown in FIG. 5) that detects the reverberation in the audio signal 250 from the far end. The reverberation parameters 260 may be obtained from metadata (see FIG. 4). Other options to obtain the reverberation parameters 260, or to perform dereverberation, are described in Patrick A. Naylor and Nikolay D. Gaubitch, "Speech Dereverberation", in Proceedings of International Workshop on Acoustic Echo and Noise Control (IWAENC '05), pp. 89-92 (Eindhoven, The Netherlands, September 2005). Further options are described in the textbook Patrick A. Naylor and Nikolay D. Gaubitch (eds.), "Speech Dereverberation" (Springer-Verlag London Limited, 2010).

An example use case is as follows. The far end device is a speakerphone; the far end environment is reverberant, so the audio signal 250 from the far end has reverberation. The near end device is the headphones 240; the near end environment is dry, so the sidetone signal 262 lacks reverberation. The dereverb filter 510 filters the reverb from the audio signal 250 so that when the output signal 254 is output from the binaural renderer 230, the near end user does not perceive an annoying difference in reverberation between the audio from the far end and the sidetone.

Figure 6:
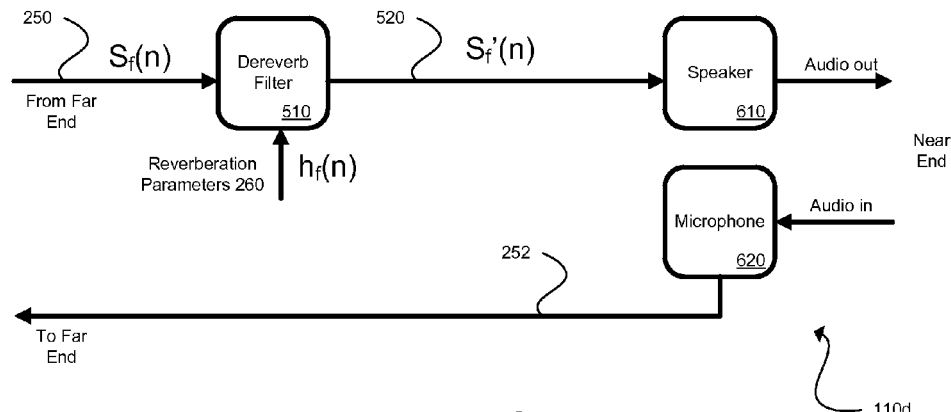
FIG. 6 is a block diagram showing details of a near end device according to one example embodiment.

FIG. 6 is a block diagram showing details of a near end device 110d (e.g., the near end device 110 of FIG. 1) according to one embodiment. The near end device 110d is similar to the near end device 110c (see FIG. 5), with similar components being numbered similarly. A difference is that the near end device 110d implements a hands-free terminal such as a speakerphone; thus various components from FIG. 5 (the binaural renderer 230, the sidetone generator 220, the headset 240, etc.) are omitted. A speaker 610 outputs the inverse filtered audio signal 520—$S_f'(n)$ at the near end, and a microphone 620 inputs audio from the near end as the audio signal 252 for transmission to the far end. Otherwise the near end device 110d operates similarly to that of the near end device 110c (see FIG. 5), including how the reverberation parameters 260 are obtained. (A speakerphone generally does not produce a sidetone due to feedback concerns; in addition, the speakerphone may deactivate the speaker 610 when a signal is detected at the near end by the microphone 620.)

Method of Operation

Figure 7:
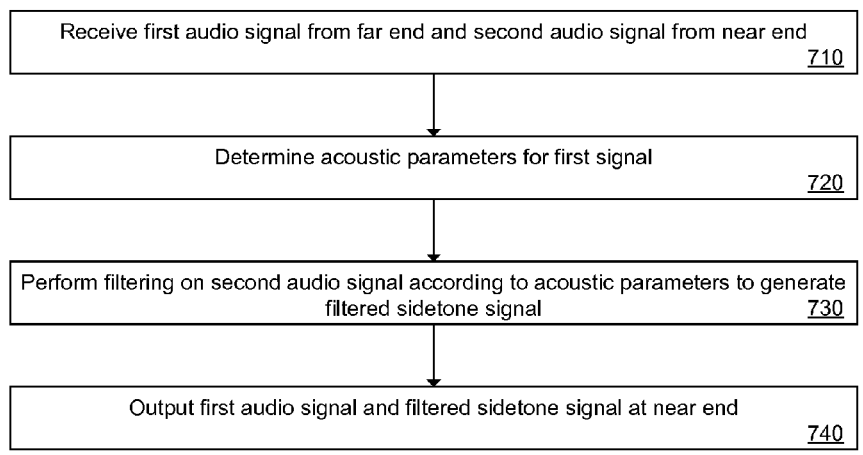
FIG. 7 is a block diagram of a method of matching acoustics in a telecommunications system according to one example embodiment.

FIG. 7 is a block diagram of a method 700 of matching acoustics in a telecommunications system according to one embodiment. The method 700 generally describes the operation of the near end device 110a (see FIG. 2) or the near end device 110b (see FIG. 4). The near end device 110a (see FIG. 2) or the near end device 110b (see FIG. 4) may implement the method 700 using hardware, software, or a combination thereof (as further detailed below).

At 710, a first audio signal is received in a near end environment from a far end environment, and a second audio signal is received from the near end environment. For example, the near end device 110a (see FIG. 2; or the near end device 110b of FIG. 4) receives the audio signal 250 from the far end and the audio signal 252 from the headset 240.

At 720, acoustic parameters are determined for the first audio signal. The acoustic parameters correspond to the far end environment. The acoustic parameters may correspond to an impulse response function $h_f(n)$ that models the acoustic environment of the far end. For example, the near end device 110a (see FIG. 2) may determine the reverberation parameters 260 using the reverb detector 210. As another example, the near end device 110b (see FIG. 4) may determine the reverberation parameters 260 according to metadata received from the far end or from a teleconferencing server.

At 730, filtering is performed on the second audio signal according to the acoustic parameters to generate a filtered sidetone signal. The second audio signal is filtered such that acoustic parameters of the filtered sidetone signal match the acoustic parameters of the first audio signal. For example, the near end device 110a (see FIG. 2; or the near end device 110b of FIG. 4) may filter the audio signal 252 from the headset 240 using the filter 320 (see FIG. 3), and may generate the sidetone signal 262 using the sidetone generator 220. The reverberation of the sidetone signal 262 matches the reverberation of the audio signal 250 from the far end because the filter 320 uses the impulse response function $h_f(n)$ that models the reverberation of the far end environment.

At 740, an output signal is output in the near end environment; the output signal corresponds to the first audio signal and the filtered sidetone signal. For example, the near end device 110a (see FIG. 2; or the near end device 110b of FIG. 4) uses the binaural renderer 230 to perform location cue processing of the audio signal 250 from the far end using the location cue generator 232; to combine the L and R signals from the location cue generator 232 with the sidetone signal 262 using the adder 234; to perform reverberation filtering on the L' and R' signals from the adder 234 using the reverb filter 236; and to output the output signal 254 to the headset 240 (e.g., the filtered signal L" to the left headphone and the filtered signal R" to the right headphone).

The user at the near end thus perceives matching reverberations and has an improved user experience.

Figure 8:
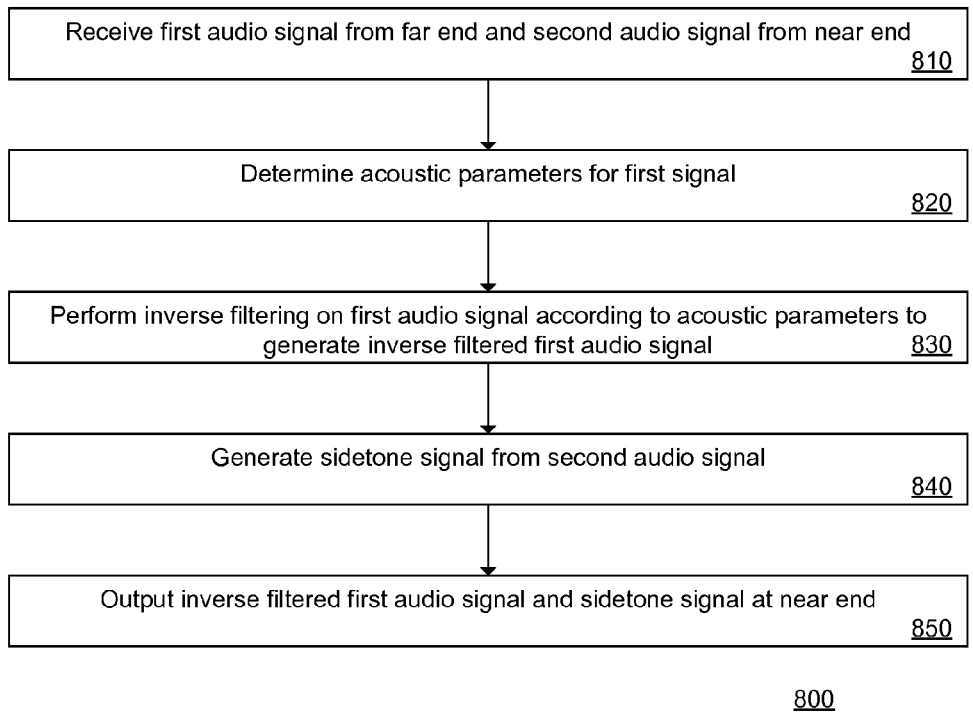
FIG. 8 is a block diagram of a method of matching acoustics in a telecommunications system according to one example embodiment.

FIG. 8 is a block diagram of a method 800 of matching acoustics in a telecommunications system according to one embodiment. The method 800 generally describes the operation of the near end device 110c (see FIG. 5). The near end device 110c (see FIG. 5) may implement the method 800 using hardware, software, or a combination thereof (as further detailed below).

At 810, a first audio signal is received in a near end environment from a far end environment, and a second audio signal is received from the near end environment. For example, the near end device 110c (see FIG. 5) receives the audio signal 250 from the far end and the audio signal 252 from the headset 240.

At 820, acoustic parameters are determined for the first audio signal. The acoustic parameters correspond to the far end environment. The acoustic parameters may correspond to an impulse response function $h_f(n)$ that models the acoustic environment of the far end. For example, the near end device 110c (see FIG. 5) may determine the reverberation parameters 260 using a reverb detector 210 (not shown) or according to metadata received from the far end or from a teleconferencing server.

At 830, inverse filtering is performed on the first audio signal according to the acoustic parameters to generate an inverse filtered first audio signal. The first audio signal is inverse filtered such that acoustic parameters of the inverse filtered first audio signal match the acoustic parameters of the first audio signal having been inverse filtered. For example, the near end device 110c (see FIG. 5) may inverse filter the audio signal 250 from the far end using the dereverb filter 510 to generate the inverse filtered audio signal 520. The reverberation of the inverse filtered audio signal 520 matches the reverberation of the audio signal 250 from the far end having been inverse filtered because the dereverb filter 510 uses the impulse response function $h_f(n)$ that models the reverberation of the far end environment.

At 840, a sidetone signal is generated from the second audio signal. For example, the near end device 110c (see FIG. 5) may use the sidetone generator 220c to generate the sidetone signal 262 from the audio signal 252 from the headset 240.

At 850, an output signal is output in the near end environment; the output signal corresponds to the inverse filtered first audio signal and the sidetone signal. For example, the near end device 110c (see FIG. 5) uses the binaural renderer 230 to perform location cue processing of the inverse filtered audio signal 520 using the location cue generator 232; to combine the L and R signals from the location cue generator 232 with the sidetone signal 262 using the adder 234; to perform reverberation filtering on the L' and R' signals from the adder 234 using the reverb filter 236; and to output the output signal 254 to the headset 240 (e.g., the filtered signal L" to the left headphone and the filtered signal R" to the right headphone).

The user at the near end thus perceives matching reverberations and has an improved user experience.

Figure 9:
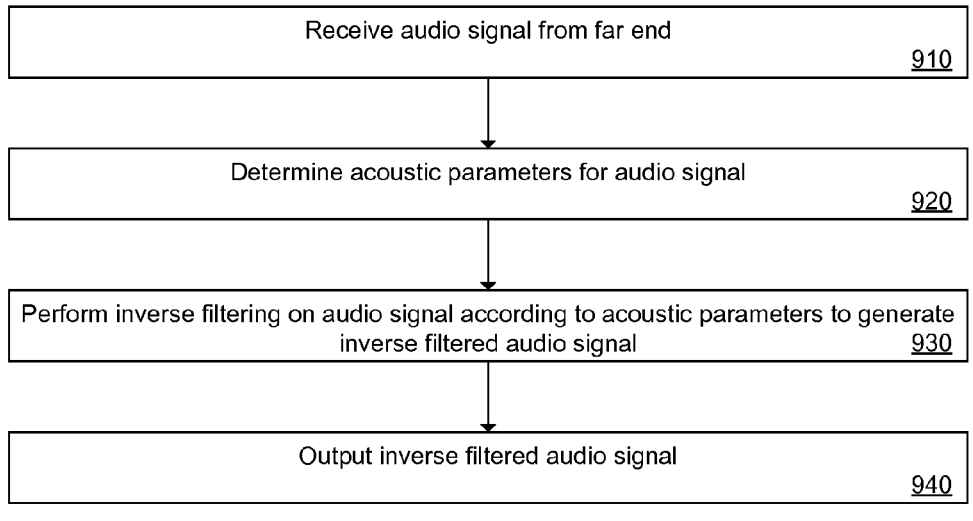
FIG. 9 is a block diagram of a method of matching acoustics in a telecommunications system according to one example embodiment.

FIG. 9 is a block diagram of a method 900 of matching acoustics in a telecommunications system according to one embodiment. The method 900 generally describes the operation of the near end device 110d (see FIG. 6). The near end device 110d (see FIG. 6) may implement the method 900 using hardware, software, or a combination thereof (as further detailed below).

At 910, an audio signal is received in a near end environment from a far end environment that differs from the near end environment. For example, the near end device 110d (see FIG. 6) receives the audio signal 250 from the far end.

At 920, acoustic parameters are determined for the audio signal. The acoustic parameters correspond to the far end environment and differ from acoustic parameters of the near end environment. The acoustic parameters may correspond to an impulse response function $h_f(n)$ that models the acoustic environment of the far end. For example, the near end device 110d (see FIG. 6) may determine the reverberation parameters 260 using a reverb detector 210 (not shown) or according to metadata received from the far end or from a teleconferencing server.

At 930, inverse filtering is performed on the audio signal according to the acoustic parameters to generate an inverse filtered audio signal. The audio signal is inverse filtered such that acoustic parameters of the inverse filtered audio signal match the acoustic parameters of the audio signal having been inverse filtered. For example, the near end device 110d (see FIG. 6) may inverse filter the audio signal 250 from the far end using the dereverb filter 510 to generate the inverse filtered audio signal 520. The reverberation of the inverse filtered audio signal 520 matches the reverberation of the audio signal 250 from the far end having been inverse filtered because the dereverb filter 510 uses the impulse response function $h_f(n)$ that models the reverberation of the far end environment.

At 940, an output signal is output in the near end environment; the output signal corresponds to the inverse filtered audio signal. For example, the near end device 110d (see FIG. 6) outputs the inverse filtered audio signal 520 using the speaker 610.

When the inverse filtered audio signal 520 is output in the near end environment, the reverberation thereof matches the reverberation that the user perceives regarding the sound generated at the near end (e.g., the user's own speech directed to a speakerphone that implements the near end device 110d); the user thus perceives matching reverberations and has an improved user experience.

Other Options

Although most of the description above illustrated one far end, similar principles may be applied when there are multiple far ends. For example, the near end device 110c of FIG. 5 (or the near end device 110d of FIG. 6) may include multiple dereverb filters 510 that may use a different set of reverberation parameters 260 for each far end, with each far end signal 250 being processed by its own dereverb filter 510.

Implementation Details

An embodiment of the invention may be implemented in hardware, executable modules stored on a computer readable medium, or a combination of both (e.g., programmable logic arrays). Unless otherwise specified, the steps included as part of the invention need not inherently be related to any particular computer or other apparatus, although they may be in certain embodiments. In particular, various general-purpose machines may be used with programs written in accordance with the teachings herein, or it may be more convenient to construct more specialized apparatus (e.g., integrated circuits) to perform the required method steps. Thus, the invention may be implemented in one or more computer programs executing on one or more programmable computer systems each comprising at least one processor, at least one data storage system (including volatile and nonvolatile memory and/or storage elements), at least one input device or port, and at least one output device or port. Program code is applied to input data to perform the functions described herein and generate output information. The output information is applied to one or more output devices, in known fashion.

Each such computer program is preferably stored on or downloaded to a storage media or device (e.g., solid state memory or media, or magnetic or optical media) readable by a general or special purpose programmable computer, for configuring and operating the computer when the storage media or device is read by the computer system to perform the procedures described herein. The inventive system may also be considered to be implemented as a computer-readable storage medium, configured with a computer program, where the storage medium so configured causes a computer system to operate in a specific and predefined manner to perform the functions described herein. (Software per se and intangible or transitory signals are excluded to the extent that they are unpatentable subject matter.)

Figure 10:
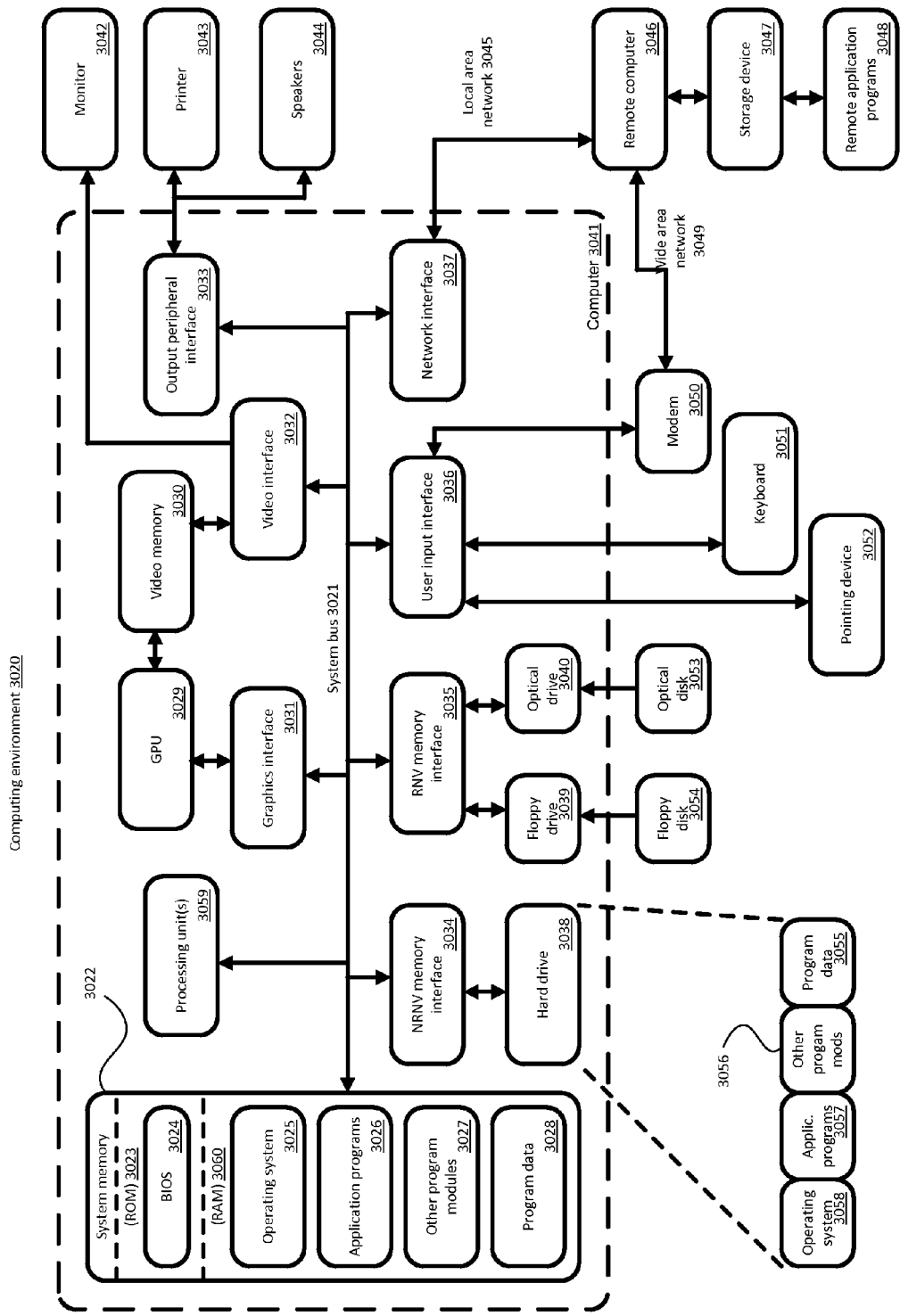
FIG. 10 is a block diagram representing an example computing device suitable for use in conjunction with implementing one or more of the processes or devices described herein.

FIG. 10 is a block diagram representing an example computing device 3020 suitable for use in conjunction with implementing one or more of the processes or devices described herein. For example, the computer executable instructions that carry out the processes and methods to implement and operate a soft phone or voice over internet protocol (VOIP) phone may reside and/or be executed in such a computing environment as shown in FIG. 10. As another example, a computer system for equalizing reverberation may include one or more components of the computing environment as shown in FIG. 10.

The computing system environment 3020 is only one example of a suitable computing environment and is not intended to suggest any limitation as to the scope of use or functionality of the invention. Neither should the computing environment 3020 be interpreted as having any dependency or requirement relating to any one or combination of components illustrated in the example operating environment 3020.

Aspects of the invention are operational with numerous other general purpose or special purpose computing system environments or configurations. Examples of well known computing systems, environments, and/or configurations that may be suitable for use with the invention include, but are not limited to, personal computers, server computers, hand-held or laptop devices, tablets, multiprocessor systems, microprocessor-based systems, set top boxes, programmable consumer electronics, network PCs, minicomputers, mainframe computers, distributed computing environments that include any of the above systems or devices, and the like.

Aspects of the invention may be implemented in the general context of computer-executable instructions, such as program modules, being executed by a computer. Generally, program modules include routines, programs, objects, components, data structures, etc. that perform particular tasks or implement particular abstract data types. Aspects of the invention may also be practiced in distributed computing environments where tasks are performed by remote processing devices that are linked through a communications network. In a distributed computing environment, program modules may be located in both local and remote computer storage media including memory storage devices.

An example system for implementing aspects of the invention includes a general purpose computing device in the form of a computer 3041. Components of computer 3041 may include, but are not limited to, a processing unit 3059, a system memory 3022, and a system bus 3021 that couples various system components including the system memory to the processing unit 3059. The system bus 3021 may be any of several types of bus structures including a memory bus or memory controller, a peripheral bus, and a local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnect (PCI) bus also known as Mezzanine bus.

Computer 3041 typically includes a variety of computer readable media. Computer readable media can be any available media that can be accessed by computer 3041 and includes both volatile and nonvolatile media (also referred to as "transitory" and "non-transitory"), removable and non-removable media. By way of example, and not limitation, computer readable media may comprise computer storage media and communication media. Computer storage media includes both volatile and nonvolatile, removable and non-removable media implemented in any method or technology for storage of information such as computer readable instructions, data structures, program modules or other data. Computer storage media includes, but is not limited to, RAM, ROM, EEPROM, solid state memory, flash memory or other memory technology, CD-ROM, digital versatile disks (DVD) or other optical disk storage, magnetic cassettes, magnetic tape, magnetic disk storage or other magnetic storage devices, or any other medium which can be used to store the desired information and which can accessed by computer 3041. Communication media typically embodies computer readable instructions, data structures, program modules or other data in a modulated data signal such as a carrier wave or other transport mechanism and includes any information delivery media. The term "modulated data signal" means a signal that has one or more of its characteristics set or changed in such a manner as to encode information in the signal. By way of example, and not limitation, communication media includes wired media such as a wired network or direct-wired connection, and wireless media such as acoustic, RF, infrared and other wireless media. Combinations of the any of the above should also be included within the scope of computer readable media (but not necessarily computer readable storage media; for example, a data signal that is not stored).

The system memory 3022 includes computer storage media in the form of volatile and/or nonvolatile memory such as read only memory (ROM) 3023 and random access memory (RAM) 3060. A basic input/output system 3024 (BIOS), containing the basic routines that help to transfer information between elements within computer 3041, such as during start-up, is typically stored in ROM 3023. RAM 3060 typically contains data and/or program modules that are immediately accessible to and/or presently being operated on by processing unit 3059. By way of example, and not limitation, FIG. 10 illustrates operating system 3025, application programs 3026, other program modules 3027, and program data 3028.

The computer 3041 may also include other removable/non-removable, volatile/nonvolatile computer storage media. By way of example only, FIG. 10 illustrates a hard disk drive 3038 that reads from or writes to non-removable, nonvolatile magnetic media, a magnetic disk drive 3039 that reads from or writes to a removable, nonvolatile magnetic disk 3054, and an optical disk drive 3040 that reads from or writes to a removable, nonvolatile optical disk 3053 such as a CD ROM or other optical media. Other removable/non-removable, volatile/nonvolatile computer storage media that can be used in the example operating environment include, but are not limited to, magnetic tape cassettes, flash memory cards, digital versatile disks, digital video tape, solid state RAM, solid state ROM, and the like. The hard disk drive 3038 is typically connected to the system bus 3021 through an non-removable memory interface such as interface 3034, and magnetic disk drive 3039 and optical disk drive 3040 are typically connected to the system bus 3021 by a removable memory interface, such as interface 3035.

The drives and their associated computer storage media discussed above and illustrated in FIG. 10, provide storage of computer readable instructions, data structures, program modules and other data for the computer 3041. In FIG. 10, for example, hard disk drive 3038 is illustrated as storing operating system 3058, application programs 3057, other program modules 3056, and program data 3055. Note that these components can either be the same as or different from operating system 3025, application programs 3026, other program modules 3027, and program data 3028. Operating system 3058, application programs 3057, other program modules 3056, and program data 3055 are given different numbers here to illustrate that, at a minimum, they are different copies. A user may enter commands and information into the computer 3041 through input devices such as a keyboard 3051 and pointing device 3052, commonly referred to as a mouse, trackball or touch pad. Other input devices (not shown) may include a microphone, joystick, game pad, satellite dish, scanner, or the like. These and other input devices are often connected to the processing unit 3059 through a user input interface 3036 that is coupled to the system bus, but may be connected by other interface and bus structures, such as a parallel port, game port or a universal serial bus (USB). A monitor 3042 or other type of display device is also connected to the system bus 3021 via an interface, such as a video interface 3032. For complex graphics, the computer 3041 may offload graphics processing through the graphics interface 3031 for processing by the graphics processing unit 3029. The graphics rendered by the graphics processing unit 3029 may be stored in the video memory 3030 and provided to the video interface 3032. In addition to the monitor, computers may also include other peripheral output devices such as speakers 3044 and printer 3043, which may be connected through an output peripheral interface 3033 (which may be a parallel port, USB port, etc.).

The computer 3041 may operate in a networked environment using logical connections to one or more remote computers, such as a remote computer 3046. The remote computer 3046 may be a personal computer, a server, a router, a network PC, a peer device or other common network node, and typically includes many or all of the elements described above relative to the computer 3041, although only a memory storage device 3047 has been illustrated in FIG. 10. The logical connections depicted in FIG. 10 include a local area network (LAN) 3045 and a wide area network (WAN) 3049, but may also include other networks. Such networking environments are commonplace in offices, enterprise-wide computer networks, intranets and the Internet.

When used in a LAN networking environment, the computer 3041 is connected to the LAN 3045 through a network interface or adapter 3037. When used in a WAN networking environment, the computer 3041 typically includes a modem 3050 or other means for establishing communications over the WAN 3049, such as the Internet. The modem 3050, which may be internal or external, may be connected to the system bus 3021 via the user input interface 3036, or other appropriate mechanism. In a networked environment, program modules depicted relative to the computer 3041, or portions thereof, may be stored in the remote memory storage device. By way of example, and not limitation, FIG. 10 illustrates remote application programs 3048 as residing on memory device 3047. It will be appreciated that the network connections shown are examples and other means of establishing a communications link between the computers may be used.

It should be understood that the various techniques described herein may be implemented in connection with hardware or software or, where appropriate, with a combination of both. Thus, the methods and apparatus of the invention, or certain aspects or portions thereof, may take the form of program code (i.e., instructions) embodied in tangible media, such as floppy diskettes, CD-ROMs, hard drives, or any other machine-readable storage medium wherein, when the program code is loaded into and executed by a machine, such as a computer, the machine becomes an apparatus for practicing the invention. In the case of program code execution on programmable computers, the computing device generally includes a processor, a storage medium readable by the processor (including volatile and non-volatile memory and/or storage elements), at least one input device, and at least one output device. One or more programs that may implement or utilize the processes described in connection with the invention, e.g., through the use of an API, reusable controls, or the like. Such programs are preferably implemented in a high level procedural or object oriented programming language to communicate with a computer system. However, the program(s) can be implemented in assembly or machine language, if desired. In any case, the language may be a compiled or interpreted language, and combined with hardware implementations.

Although example embodiments may refer to utilizing aspects of the invention in the context of one or more stand-alone computer systems, the invention is not so limited, but rather may be implemented in connection with any computing environment, such as a network or distributed computing environment. Still further, aspects of the invention may be implemented in or across a plurality of processing chips or devices, and storage may similarly be effected across a plurality of devices. Such devices might include personal computers, network servers, handheld devices, supercomputers, or computers integrated into other systems such as automobiles and airplanes.

For example, the computer system of FIG. 10 may implement the near end device 110a (see FIG. 2), with the application programs 3026 including computer program code to implement the method 700 (see FIG. 7), which is executed by the processing unit(s) 3059. The headset 2401 may be connected via USB, for example via the user input interface 3036 or the output peripheral interface 3033. The computer system of FIG. 10 may connect to another device at the far end via the network interface 3037.

General Operational Description

Figure 11:
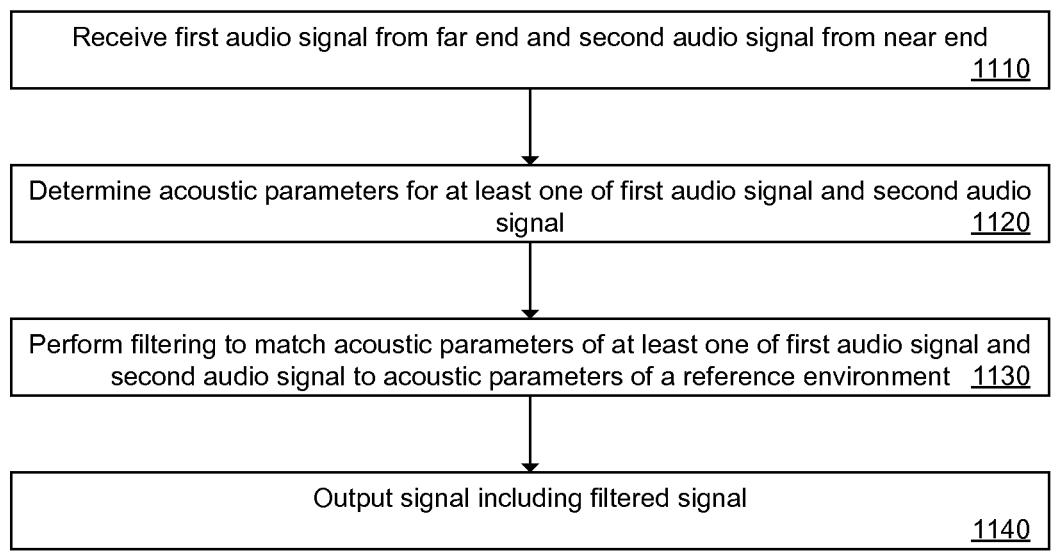
FIG. 11 is a block diagram of a method of matching acoustics in a telecommunications system according to one example embodiment.

FIG. 11 is a block diagram of a method 1100 of matching acoustics in a telecommunications system according to one embodiment. The method 1100 generally describes the operation of any of the near end devices 110 (e.g., 110a in FIG. 2, 110b in FIG. 4, 110c in FIG. 5, 110d in FIG. 6), as well as the methods of operation of FIGS. 7-9. The near end device 110 (see FIG. 1) may implement the method 1100 using hardware, software, or a combination thereof (as detailed above regarding FIG. 10).

At 1110, in a near end environment, a first audio signal is received from a far end environment, and a second audio signal is received from the near end environment. For example, the near end device 110a of FIG. 2 (or 110b of FIG. 4, or 110c of FIG. 5, or 110d of FIG. 6) receives the audio signal 250 from the far end and the audio signal 252 from the near end. See also 710 in FIG. 7, 810 in FIG. 8, and 910 in FIG. 9.

At 1120, acoustic parameters are determined for at least one of the first audio signal and the second audio signal. The acoustic parameters correspond to at least one of the far end environment for the first audio signal and the near end environment for the second audio signal. For example, in the near end device 110a (see FIG. 2), the reverb detector 210 determines the reverberation parameters 260. As another example, the near end device 110b (see FIG. 4) determines the acoustic parameters according to the reverberation parameters 260 received as metadata. See also 720 in FIG. 7, 820 in FIG. 8, and 920 in FIG. 9.

At 1130, filtering is performed on at least one of the first audio signal and the second audio signal in order to match the acoustic parameters of at least one of the first audio signal and the second audio signal to acoustic parameters of a reference environment. For example, the sidetone generator 220 (see FIG. 2 or FIG. 4) includes a filter 320 (see FIG. 3) that filters the audio signal 252 from the near end to match the audio signal 250 from the far end. As another example, the dereverb filter 510 (see FIG. 5 or FIG. 6) performs inverse filtering on the audio signal 250 from the far end. See also 730 in FIG. 7, 830 in FIG. 8, and 930 in FIG. 9.

The reference environment may be the far end environment, the near end environment, or a third environment that differs from the far end environment and the near end environment. When the reference environment is the far end environment, the audio signal 252 from the near end may be matched thereto as described in FIG. 2, FIG. 4 or FIG. 7. When the reference environment is the near end environment, the audio signal 250 from the far end may be matched thereto by inverse filtering as described in FIG. 5, FIG. 6, FIG. 8, or FIG. 9.

When the reference environment is the third environment, it may be selected from one of a set of environments including a dry environment (no reverberation), a small room (low reverberation), or a large room (medium reverberation). Both the audio signal from the near end and the audio signal from the far end may be matched to the third environment. For example, the audio signal 252 from the near end may matched to the third environment using the sidetone generator 220 (see FIG. 2 or FIG. 4, or 730 in FIG. 7), and the audio signal 250 from the far end may be matched to the third environment using the dereverb filter 510 (see FIG. 5 or FIG. 6, or 830 in FIG. 8, or 930 in FIG. 9).

At 1140, an output signal is output in the near end environment. The output signal includes the filtered signal (from 1130). For example, the output signal 254 (see FIG. 2 or FIG. 4) includes the audio signal 250 from the far end and the sidetone signal 262, as processed by the binaural renderer 230. As another example, the output signal 254 (see FIG. 5) includes the inverse filtered audio signal 520 and the sidetone signal 262, as processed by the binaural renderer 230. As another example, the speaker 610 outputs the inverse filtered audio signal 520. See also 740 in FIG. 7, 850 in FIG. 8, and 940 in FIG. 9.

The above description illustrates various embodiments of the present invention along with examples of how aspects of the present invention may be implemented. The above examples and embodiments should not be deemed to be the only embodiments, and are presented to illustrate the flexibility and advantages of the present invention as defined by the following claims. Based on the above disclosure and the following claims, other arrangements, embodiments, implementations and equivalents will be evident to those skilled in the art and may be employed without departing from the spirit and scope of the invention as defined by the claims.

What is claimed is:

1. A method of matching acoustics in a telecommunications system, comprising:
    receiving, in a near end environment, a first audio signal from a far end environment and a second audio signal from the near end environment;
    determining acoustic parameters for at least one of the first audio signal and the second audio signal, wherein the acoustic parameters correspond to at least one of the far end environment for the first audio signal and the near end environment for the second audio signal;
    performing filtering on at least one of the first audio signal and the second audio signal in order to match the acoustic parameters of at least one of the first audio signal and the second audio signal to acoustic parameters of a reference environment; and
    outputting in the near end environment an output signal including the filtered signal,
    wherein the reference environment corresponds to one of the far end environment, the near end environment, and a third environment that differs from the far end environment and the near end environment.

2. The method of claim 1, wherein determining acoustic parameters comprises determining the acoustic parameters for the first audio signal, wherein the acoustic parameters correspond to the far end environment for the first audio signal;
    wherein performing filtering comprises performing filtering on the second audio signal in order to match the acoustic parameters of the second audio signal to the acoustic parameters of the reference environment; and
    wherein outputting comprises outputting in the near end environment the output signal including the filtered signal and the first audio signal.

3. The method of claim 1, wherein determining acoustic parameters comprises determining the acoustic parameters for the first audio signal, wherein the acoustic parameters correspond to the far end environment for the first audio signal;
    wherein performing filtering comprises performing inverse filtering on the first audio signal in order to match the acoustic parameters of the first audio signal to the acoustic properties of the reference environment; and
    wherein outputting comprises outputting in the near end environment the output signal including the inverse filtered signal and the second audio signal.

4. The method of claim 1, wherein determining acoustic parameters comprises determining the acoustic parameters for the first audio signal, wherein the acoustic parameters correspond to the far end environment for the first audio signal;
    wherein performing filtering comprises performing inverse filtering on the first audio signal in order to match the acoustic parameters of the first audio signal to the acoustic properties of the reference environment; and wherein outputting comprises outputting in the near end environment the output signal including the inverse filtered signal.

5. The method of claim 1, wherein determining acoustic parameters comprises:
    detecting a reverberation in the first audio signal; and
    generating an impulse response function that models the reverberation in the first audio signal.

6. The method of claim 1, wherein determining acoustic parameters comprises:
    receiving metadata that is descriptive of an acoustic environment of the far end environment; and
    generating, from the metadata, an impulse response function that models a reverberation in the acoustic environment of the far end environment.

7. The method of claim 1, wherein performing filtering comprises performing filtering on the second audio signal according to an impulse response function that models a reverberation in the first audio signal.

8. The method of claim 1, wherein performing filtering comprises performing filtering on the first audio signal according to an impulse response function that models a reverberation in the second audio signal.

9. The method of claim 1, further comprising:
    performing location cue processing on the first audio signal to generate a left signal and a right signal having location cues;
    adding the filtered signal to the left signal and to the right signal to generate a left combined signal and a right combined signal; and
    performing reverberation filtering on the left combined signal and the right combined signal to generate the output signal.

10. The method of claim 1, wherein determining acoustic parameters comprises determining the acoustic parameters for the first audio signal and determining the acoustic parameters for the second audio signal; and
    wherein performing filtering comprises performing filtering on the first audio signal and the second audio signal in order to match the acoustic parameters of the first audio signal and the acoustic parameters of the second audio signal to the acoustic parameters of the reference environment.

11. An apparatus for matching acoustics in a telecommunications system, comprising:
    a first circuit that is configured to receive, in a near end environment, a first audio signal from a far end environment;
    a second circuit that is configured to receive, in the near end environment, a second audio signal from the near end environment;
    a third circuit that is configured to determine acoustic parameters for at least one of the first audio signal and the second audio signal, wherein the acoustic parameters correspond to at least one of the far end environment for the first audio signal and the near end environment for the second audio signal;
    a filter circuit that is configured to perform filtering on at least one of the first audio signal and the second audio signal in order to match the acoustic parameters of at least one of the first audio signal and the second audio signal to acoustic parameters of a reference environment; and
    an output circuit that is configured to output in the near end environment an output signal including the filtered signal,
    wherein the reference environment corresponds to one of the far end environment, the near end environment, and a third environment that differs from the far end environment and the near end environment.

12. The apparatus of claim 11, wherein determining acoustic parameters comprises determining the acoustic parameters for the first audio signal, wherein the acoustic parameters correspond to the far end environment for the first audio signal;
    wherein performing filtering comprises performing filtering on the second audio signal in order to match the acoustic parameters of the second audio signal to the acoustic parameters of the reference environment; and
    wherein outputting comprises outputting in the near end environment the output signal including the filtered signal and the first audio signal.

13. The apparatus of claim 11, wherein determining acoustic parameters comprises determining the acoustic parameters for the first audio signal, wherein the acoustic parameters correspond to the far end environment for the first audio signal;
    wherein performing filtering comprises performing inverse filtering on the first audio signal in order to match the acoustic parameters of the first audio signal to the acoustic properties of the reference environment; and
    wherein outputting comprises outputting in the near end environment the output signal including the inverse filtered signal and the second audio signal.

14. The apparatus of claim 11, wherein determining acoustic parameters comprises determining the acoustic parameters for the first audio signal, wherein the acoustic parameters correspond to the far end environment for the first audio signal;
    wherein performing filtering comprises performing inverse filtering on the first audio signal in order to match the acoustic parameters of the first audio signal to the acoustic properties of the reference environment; and
    wherein outputting comprises outputting in the near end environment the output signal including the inverse filtered signal.

15. The apparatus of claim 11, wherein determining acoustic parameters comprises:
    detecting a reverberation in the first audio signal; and
    generating an impulse response function that models the reverberation in the first audio signal.

16. The apparatus of claim 11, wherein determining acoustic parameters comprises:
    receiving metadata that is descriptive of an acoustic environment of the far end environment; and
    generating, from the metadata, an impulse response function that models a reverberation in the acoustic environment of the far end environment.

17. The apparatus of claim 11, wherein performing filtering comprises performing filtering on the second audio signal according to an impulse response function that models a reverberation in the first audio signal.

18. The apparatus of claim 11, wherein performing filtering comprises performing filtering on the first audio signal according to an impulse response function that models a reverberation in the second audio signal.

19. The apparatus of claim 11, further comprising:
a location cue generator circuit that is configured to perform location cue processing on the first audio signal to generate a left signal and a right signal having location cues;
an adder circuit that is configured to add the filtered signal to the left signal and to the right signal to generate a left combined signal and a right combined signal; and
a reverb filter circuit that is configured to perform reverberation filtering on the left combined signal and the right combined signal to generate the output signal.

20. The apparatus of claim 11, wherein determining acoustic parameters comprises determining the acoustic parameters for the first audio signal and determining the acoustic parameters for the second audio signal; and
wherein performing filtering comprises performing filtering on the first audio signal and the second audio signal in order to match the acoustic parameters of the first audio signal and the acoustic parameters of the second audio signal to the acoustic parameters of the reference environment.

21. A computer program tangibly embodied on a non-transitory computer readable medium that is configured to control a computer to execute processing for matching acoustics in a telecommunications system, comprising instructions for:
receiving, by the computer in a near end environment, a first audio signal from a far end environment and a second audio signal from the near end environment;
determining, by the computer, acoustic parameters for at least one of the first audio signal and the second audio signal, wherein the acoustic parameters correspond to at least one of the far end environment for the first audio signal and the near end environment for the second audio signal;
performing filtering, by the computer, on at least one of the first audio signal and the second audio signal in order to match the acoustic parameters of at least one of the first audio signal and the second audio signal to acoustic parameters of a reference environment; and
outputting, by the computer, in the near end environment an output signal including the filtered signal,
wherein the reference environment corresponds to one of the far end environment, the near end environment, and a third environment that differs from the far end environment and the near end environment.

22. The computer program of claim 21, wherein determining acoustic parameters comprises determining the acoustic parameters for the first audio signal, wherein the acoustic parameters correspond to the far end environment for the first audio signal;
wherein performing filtering comprises performing filtering on the second audio signal in order to match the acoustic parameters of the second audio signal to the acoustic parameters of the reference environment; and
wherein outputting comprises outputting in the near end environment the output signal including the filtered signal and the first audio signal.

23. The computer program of claim 21, wherein determining acoustic parameters comprises determining the acoustic parameters for the first audio signal, wherein the acoustic parameters correspond to the far end environment for the first audio signal;
wherein performing filtering comprises performing inverse filtering on the first audio signal in order to match the acoustic parameters of the first audio signal to the acoustic properties of the reference environment; and
wherein outputting comprises outputting in the near end environment the output signal including the inverse filtered signal and the second audio signal.

24. The computer program of claim 21, wherein determining acoustic parameters comprises determining the acoustic parameters for the first audio signal, wherein the acoustic parameters correspond to the far end environment for the first audio signal;
wherein performing filtering comprises performing inverse filtering on the first audio signal in order to match the acoustic parameters of the first audio signal to the acoustic properties of the reference environment; and
wherein outputting comprises outputting in the near end environment the output signal including the inverse filtered signal.

25. The computer program of claim 21, wherein determining acoustic parameters comprises:
detecting a reverberation in the first audio signal; and
generating an impulse response function that models the reverberation in the first audio signal.

26. The computer program of claim 21, wherein determining acoustic parameters comprises:
receiving metadata that is descriptive of an acoustic environment of the far end environment; and
generating, from the metadata, an impulse response function that models a reverberation in the acoustic environment of the far end environment.

27. The computer program of claim 21, wherein performing filtering comprises performing filtering on the second audio signal according to an impulse response function that models a reverberation in the first audio signal.

28. The computer program of claim 21, wherein performing filtering comprises performing filtering on the first audio signal according to an impulse response function that models a reverberation in the second audio signal.

29. The computer program of claim 21, the instructions further comprising:
performing location cue processing on the first audio signal to generate a left signal and a right signal having location cues;
adding the filtered signal to the left signal and to the right signal to generate a left combined signal and a right combined signal; and
performing reverberation filtering on the left combined signal and the right combined signal to generate the output signal.

30. The computer program of claim 21, wherein determining acoustic parameters comprises determining the acoustic parameters for the first audio signal and determining the acoustic parameters for the second audio signal; and
wherein performing filtering comprises performing filtering on the first audio signal and the second audio signal in order to match the acoustic parameters of the first audio signal and the acoustic parameters of the second audio signal to the acoustic parameters of the reference environment.

* * * * *